(12) United States Patent
Dubach et al.

(10) Patent No.: US 12,161,202 B2
(45) Date of Patent: Dec. 10, 2024

(54) METHOD FOR MANUFACTURING A COMPOSITE COMPONENT OF A TIMEPIECE OR OF A JEWELRY PART, AND COMPOSITE COMPONENT OBTAINABLE BY SUCH METHOD

(71) Applicant: The Swatch Group Research and Development Ltd., Marin (CH)

(72) Inventors: Alban Dubach, Bienne (CH); Pablo Rodriguez, Neuchatel (CH); Robert Pompe, Molndal (SE)

(73) Assignee: The Swatch Group Research and Development Ltd., Marin (CH)

( * ) Notice: Subject to any disclaimer, the term of this patent is extended or adjusted under 35 U.S.C. 154(b) by 33 days.

(21) Appl. No.: 17/575,758

(22) Filed: Jan. 14, 2022

(65) Prior Publication Data
US 2022/0133003 A1    May 5, 2022

Related U.S. Application Data

(62) Division of application No. 15/095,385, filed on Apr. 11, 2016, now abandoned.

(30) Foreign Application Priority Data

May 13, 2015    (EP) .................................. 15167491

(51) Int. Cl.
*A47C 27/00*    (2006.01)
*A44C 25/00*    (2006.01)
(Continued)

(52) U.S. Cl.
CPC .......... *A44C 27/006* (2013.01); *A44C 25/00* (2013.01); *A44C 27/00* (2013.01); *C04B 35/584* (2013.01); *C04B 41/009* (2013.01); *C04B 41/4523* (2013.01); *C04B 41/4531* (2013.01); *C04B 41/5105* (2013.01); *C04B 41/5111* (2013.01); *C04B 41/5116* (2013.01); *C04B 41/5122* (2013.01); *C04B 41/52* (2013.01); *C04B 41/88* (2013.01); *C04B 41/90* (2013.01); *C22C 1/0466* (2013.01); *C22C 1/1036* (2013.01); *C22C 5/02* (2013.01); *C22C 5/04* (2013.01); *C22C 32/001* (2013.01); *C22C 32/0021* (2013.01); *C22C 32/0068* (2013.01); *B22F 10/22* (2021.01); *B22F 10/66* (2021.01); *B22F 2999/00* (2013.01); *Y02P 10/25* (2015.11)

(58) Field of Classification Search
CPC ......... C22C 32/00; C22C 5/02; C22C 1/0466; C22C 1/1036; C22C 5/04; C22C 32/001; C22C 32/0021; C22C 32/0068; C04B 41/5111; C04B 35/584; C04B 41/4531; C04B 41/4523; C04B 41/5105; C04B 41/009; C04B 41/5116; C04B 41/5122; C04B 41/52; C04B 41/88; C04B 41/90; B22D 19/00; A47C 27/006; A47C 27/00; A47C 25/00
USPC ........................................................ 428/221
See application file for complete search history.

(56) References Cited

U.S. PATENT DOCUMENTS

| | | | | |
|---|---|---|---|---|
| 4,296,065 | A | * | 10/1981 | Ishii ...................... C04B 35/593 |
| | | | | 264/328.2 |
| 5,676,907 | A | | 10/1997 | Ritland et al. |
| 2001/0033038 | A1 | * | 10/2001 | Sakaguchi .......... C04B 41/5096 |
| | | | | 164/79 |
| 2004/0013861 | A1 | | 1/2004 | Miyanaga |
| 2012/0262025 | A1 | | 10/2012 | Goehler et al. |
| 2013/0344316 | A1 | * | 12/2013 | Hasanovic ............... C22C 32/00 |
| | | | | 164/111 |

FOREIGN PATENT DOCUMENTS

JP    2001-234272    8/2001

OTHER PUBLICATIONS

European Search Report issued Nov. 17, 2015 in European Application 15167491.8 filed on May 13, 2015.
(Continued)

*Primary Examiner* — Jeremy R Pierce
(74) *Attorney, Agent, or Firm* — Oblon, McClelland, Maier & Neustadt, L.L.P.

(57) ABSTRACT

The invention relates to a method for manufacturing a composite component of a timepiece or of a jewelry part, the composite component comprising a porous ceramic part and a metallic material filling the pores of said ceramic part, said method comprising the steps of:
  providing a porous ceramic preform of the component,
  providing a metallic material,
  heating the metallic material to a temperature higher than the melting point of the metallic material,
  filling the pores of the ceramic preform with the molten metallic material,
  cooling the metallic material and the ceramic preform to obtain a solidified metallic material in the pores of the ceramic preform, and
  applying finishing treatments to obtain the composite component,
wherein said porous ceramic preform consists essentially of a material selected from the group consisting of $Si_3N_4$, $SiO_2$ and mixtures thereof, and said metallic material is selected from the group consisting of gold, platinum, palladium metals and alloys of these metals.

The invention relates also to a composite component of a timepiece or of a jewelry part comprising a porous ceramic part and a metallic material filling the pores of said ceramic part, wherein said porous ceramic part consists essentially of a material selected from the group consisting of $Si_3N_4$, $SO_2$ and mixtures thereof, and said metallic material which is selected from the group consisting of gold, platinum, palladium metals and alloys of these metals.

8 Claims, No Drawings

(51) Int. Cl.
    *A44C 27/00*     (2006.01)
    *C04B 35/584*     (2006.01)
    *C04B 41/00*     (2006.01)
    *C04B 41/45*     (2006.01)
    *C04B 41/51*     (2006.01)
    *C04B 41/52*     (2006.01)
    *C04B 41/88*     (2006.01)
    *C04B 41/90*     (2006.01)
    *C22C 1/04*     (2023.01)
    *C22C 1/10*     (2023.01)
    *C22C 5/02*     (2006.01)
    *C22C 5/04*     (2006.01)
    *C22C 32/00*     (2006.01)
    *B22F 10/22*     (2021.01)
    *B22F 10/66*     (2021.01)

(56)     References Cited

OTHER PUBLICATIONS

Silicon Nitride: Properties, Production and Applications. (Year: 2001).

\* cited by examiner

METHOD FOR MANUFACTURING A COMPOSITE COMPONENT OF A TIMEPIECE OR OF A JEWELRY PART, AND COMPOSITE COMPONENT OBTAINABLE BY SUCH METHOD

This application claims priority from European Patent Application No. 15167491.8 filed on May 13, 2015, the entire disclosure of which is hereby incorporated herein by reference.

FIELD OF THE INVENTION

The present invention generally relates to a method for manufacturing a composite component of a timepiece or of a jewelry part, the composite component comprising a porous ceramic part and a noble metallic material filling the pores of said ceramic part. The present invention relates also to a composite component of a timepiece or of a jewelry part comprising a porous ceramic part and a noble metallic material filling the pores of said ceramic part.

BACKGROUND OF THE INVENTION

In their pure form, the noble metals have particularly low hardness (e.g. 20-30 HV for pure gold or ~50 HV for pure platinum). Hardening can be done by alloying the noble metals with additional elements leading to solid solution hardening, disorder-order hardening, precipitation hardening and/or dispersion hardening. Grain size control and cold working can further increase the hardness. Nevertheless, by using these metallurgical strengthening methods the hardness of noble metal alloys remains low (e.g. at best a hardness of about 320 HV can be reached for 18K gold alloys).

Alternatively, the noble metal can be hardened through the incorporation of small, hard particles ("particle reinforced metal matrix composites"). However, the attainable hardness gain is limited (typically, hardness of about 500 HV can be reached for 18K gold composites). Examples of such particle reinforced gold composites and their hardness can be found e.g. in the patent application WO 2006/110179.

Another alternative consists in the infiltration of ceramic preforms. By using this technology the hardness of noble metal-ceramic composites can be increased significantly. An example of such a composite is given in the patent application WO 2012/119647. The composite material contains a precious metal/alloy and a boron-based ceramic. Hardness values above 1000 HV were measured for a 18K gold composite. However the main drawback of the method described is its high infiltration pressure and/or temperature.

SUMMARY OF THE INVENTION

In view of the above, it is an object of the present invention to provide an alternative and simpler method for manufacturing a composite component of a timepiece or of a jewelry part with high hardness.

Further objects of the invention are to provide a composite component of a timepiece or of a jewelry part with high hardness and to provide a timepiece or a jewelry part comprising a composite component with high hardness.

These objects and further advantages are achieved by a method for manufacturing a composite component of a timepiece or of a jewelry part, the composite component comprising a porous ceramic part and a metallic material filling the pores of said ceramic part, said method comprising the steps of:
  providing a porous ceramic preform of the component,
  providing a metallic material,
  heating the metallic material to a temperature higher than the melting point of the metallic material,
  filling the pores of the ceramic preform with the molten metallic material,
  cooling the metallic material and the ceramic preform to obtain a solidified metallic material in the pores of the ceramic preform, and
  applying finishing treatments to obtain the composite component,
wherein said porous ceramic preform consists essentially of a material selected from the group consisting of $Si_3N_4$, $SiO_2$ and mixtures thereof, and said metallic material is selected from the group consisting of gold, platinum, palladium metals and alloys of these metals.

The present invention relates also to a composite component of a timepiece or of a jewelry part comprising a porous ceramic part and a metallic material filling the pores of said ceramic part, wherein said porous ceramic part consists essentially of a material selected from the group consisting of $Si_3N_4$, $SiO_2$ and mixtures thereof, and said metallic material is selected from the group consisting of gold, platinum, palladium metals and alloys of these metals. Such a composite component is obtainable by the method as defined above.

The present invention relates also to a timepiece or a jewelry part comprising a composite component as defined above.

Advantageous embodiments of the invention are defined in the dependent claims and explained in the description.

DETAILED DESCRIPTION OF THE INVENTION

The present invention related to a method for manufacturing a composite component of a timepiece or of a jewelry part, said composite component comprising a porous ceramic part and a metallic material filling the pores of said ceramic part, comprises the steps of:
  providing a porous ceramic preform of the component,
  providing a metallic material,
  heating the metallic material to a temperature higher than the melting point of the metallic material,
  filling the pores of the ceramic preform with the molten metallic material,
  cooling (slow or fast, so-called quenching) the metallic material and the ceramic preform to obtain a solidified metallic material in the pores of the ceramic preform, and
  applying finishing treatments to obtain the composite component.

According to the invention, said porous ceramic preform consists essentially or mainly of a material selected from the group consisting of $Si_3N_4$, $SiO_2$ and mixtures thereof. These ceramics are known to be fine-grained (in the micron-submicron range) and thus also the pore size distribution of the corresponding pre-forms is within the said range. The ceramic has a melting point higher than that of the metallic material.

As an example, the porous ceramic preform is mainly composed of silicon nitride ($Si_3N_4$), and preferably Reaction Bonded Silicon Nitride. Such Reaction Bonded Silicon Nitride is obtained from a mixture of silicon powder and binder. The methods for obtaining such material are well known from one skilled in the art and need here no further details.

Advantageously, the ceramic preform of the composite component is a net-shape preform. Such a net-shape preform avoids any and all unnecessary machining operations of the final composite component.

In order to ensure appropriate porosity control and at the same time use a net-shape forming process, the preferred manufacturing technology for the porous ceramic preform is by ceramic powder injection moulding.

This technology allows selecting a fixed solid-to-binder ratio using appropriate processing parameters. Furthermore, the feedstock, when adequately processed, is completely homogeneous, without any density variation, disregarding size or shape of the composite component to be manufactured.

The binder may be removed by heating it for about 12 h to a temperature comprised between 500° C. and 600° C. In an alternative embodiment, the binder is removed by using water or non-aqueous extraction or supercritical $CO_2$ at a temperature comprised between 50° C. and 65° C. and a pressure between about 100 bar and 300 bar and holding it for about 3 h.

After complete removal of the binder component the ceramic part will have a corresponding well-determined porosity that, after further processing (e.g. sintering or reaction bonding), is available for the step of filling the pores of the ceramic preform with the molten metallic material.

Preferably, the porosity level of the porous ceramic preform is calculated according to a desired carat level to be achieved by the composite element.

The porosity is to be calculated based on the well-established formulas according to below:

$$VOLUME(ceramic\ part) + VOLUME(metallic\ material) = VOLUME(composite\ component)$$

where VOLUME(ceramic part) is Mass fraction(ceramic part)/Density(ceramic part) and VOLUME(metallic material) is Mass fraction(metallic material)/Density(metallic material), respectively. The porosity of the ceramic preform will thus correspond to the volume occupied by the metallic material to be infiltrated into the same.

Moreover, the porosity must be minimized in order to achieve optimal properties inherent from the ceramic part of the composite component. In addition to high hardness, toughness and strength, it is thus necessary, based on the above formula, to select the ceramic part with low density.

After determining the desired carat level or fineness (based on the above formula) a corresponding injection moulding feedstock is designed, based on the processing parameter variables well known from one skilled in the art. The main critical ones will in the present case be those of particle size of the starting silicon powder and of the binder components that will increase or decrease the feedstock viscosity.

Thus, as a theoretical example, for 24 carat gold to be infiltrated into the porous structure of a reaction-bonded silicon nitride shape, a porosity level of 33.3 vol % is required to obtain an 18 carat gold composite. The reaction-bonded silicon nitride shape to be prepared has to have a corresponding density of 66.7% of the theoretical. The particle size of the silicon powder to be used as a precursor for this ceramic preform will need to be tailored in order to obtain stable feedstock for powder injection moulding. Related theoretical calculation shows that the solids loading of this silicon powder feedstock has to be 54.5 vol % in order to give a reaction-bonded silicon nitride preform of the above-mentioned density.

According to a preferred embodiment of the invention, the step of filling the pores of the ceramic preform with the molten metallic material is an infiltration step by an infiltration process, which is well known from skilled in the art.

According to the invention, said metallic material is selected from the group consisting of pure gold, platinum, palladium metals and alloys of these metals. The alloys are preferably alloys of such metals with silicon, that means alloys of gold and silicon, alloys of platinum and silicon and alloys of palladium and silicon.

In order to facilitate the infiltration process the preferred selection are alloys that have a low eutectic point at low second components content. In this way, there is more flexibility regarding the processing temperature as well as the choice of the carat level of the final composite component. Also, the TEC (thermal expansion coefficient) mismatch is minimized, processing facilitated due to lower operating temperature and the cooling time shortened with the better micro-structural control as a consequence.

In another preferred embodiment, the second components of the alloy with low eutectic point and low second content are those of low solid state solubility, or essentially insoluble, in the precious metal. Precipitated particles of these second components on cooling will then be possible to utilize to impart further improved mechanical properties by the known mechanisms of particulate precipitation strengthening and/or hardening. Additional esthetic effects can also be considered.

Preferably, the metallic material is an alloy of gold and silicon, or an alloy of platinum and silicon or an alloy of palladium and silicon, used with or near its eutectic composition.

Preferably, the metallic material is an alloy of gold and silicon used with or near its eutectic composition at 363° C. (Au-3 wt. % Si).

In an alternative embodiment, said alloy is molten but, instead of infiltration:
a) is converted into fine (micron-range) powder (crystalline or amorphous) by known techniques, then mixed with the aforementioned ceramic powders and processed into shape using known powder technologies, additive manufacturing (AM) or equivalent techniques or
b) is sprayed (thermal spray torch, dedicated AM system for elevated temperature melt droplet deposition) into a product-shape cavity.

The porous ceramic preform can be used as such for the infiltration step.

However, the method of the invention comprises advantageously a further step of coating the internal walls of the pores of the ceramic preform with a wetting agent before the step of filling the pores of the ceramic preform with the molten metallic material. For example, the wetting agent may be pure gold, platinum or palladium, or alloy thereof.

Such further step is desirable to facilitate the infiltration process to ensure appropriate filling of the pore system. In a preferred embodiment, internal coating of the pore walls is performed in order to enhance the wetting behavior between the ceramic and the gold, platinum or palladium metal/alloy.

Due to the fine (micron-submicron range) of the porosity, substantial capillary force action is anticipated during the infiltration process. In order to promote the same it is preferred to also improve the wetting between the pore walls and the metal/alloy to be infiltrated.

In a preferred embodiment, the internal pore system of the preform, prior to metal/alloy infiltration processing, is coated with a wetting agent, this agent preferably but not necessarily being of equivalent composition to that of the metal/alloy. The coating process is based on known techniques of either a) CVD/PVD/ALD or other gas-phase techniques or b) electroless coating where the pore system is impregnated with an aqueous/non-aqueous solution containing the metal to be coated on the pore walls. Such methods are well known from one skilled in the art and need here no further details.

As an example, gold electroless deposition or gold (vacuum) evaporation deposition can be preferably used. However, any other metal such as chromium, titanium, nickel, etc. can be used. The pore wall coating, when properly performed, does not lead to more than deposition of one or few atomic layers. Thus it does not measurably alter the composition of the alloy.

The melt infiltration is done at elevated temperature (>melting point of the gold, platinum or palladium metal or alloy).

Preferably, the melt infiltration is done at low pressure or without applying any additional pressure on the molten metal.

Due to the abovementioned pore structure combined with coating of the pore walls, the infiltration will mainly occur by the capillary action without any need of external pressure. The hydrostatic pressure of the precious metal or alloy, due to their in general high densities, is sufficient to promote the intrusion into the pore system. However, for larger composite component (over 3 mm thickness) it can be envisioned to add some low pressure action. In that case, the pressure level of less than 10 atm (1 MPa) is sufficient to be used.

In a preferred embodiment, to ensure full pore filling, the infiltration is performed at the preselected temperature and in vacuum, the vacuum level being preferably 10 mbar (1000 Pa) or less.

After infiltration of the metallic material into the fine (micron to submicron) pore structure of a ceramic preform it is important to condition the metallic material by using appropriate cooling rate. In a preferred embodiment, the infiltrated metallic material part and the ceramic preform are cooled at a high rate, so-called quenching, sufficient as to prevent/minimize diffusion of the second alloy components of the metallic material between the adjacent pores. Depending on the large variety of alloy choices and part sizes, the cooling rate is a parameter to be individually adjusted for each specific case.

After cooling of the metallic material and of the ceramic preform, only some finishing treatments are needed to be applied to obtain the composite element of the invention.

Such finishing treatment comprises the removal of excess metallic material. The solidified metallic material remaining on the surface of the preform has to be removed. This is done by known techniques such as (micro-)sand blasting. The blasting media is selected to be of lower hardness than the material of the ceramic preform. No other hard machining is necessary as the net shape of the ceramic preform corresponds to the shape of the composite component of the invention.

The finishing treatment comprises also finishing operations which are carried out to get the desired surface quality/aspect. Established surface treatment operations such as but not limited to polishing, brushing, sand blasting, shot peening and (electro-)chemical treatments are compatible with the current impregnated preform in order to impart appropriate surface appearance.

The present invention relates also to a composite component of a timepiece or of a jewelry part comprising a porous ceramic part or body and a metallic material filling the pores of said ceramic part, wherein said porous ceramic part consists essentially of a material selected from the group consisting of $Si_3N_4$, $SiO_2$ and mixtures thereof, and said metallic material is selected from the group consisting of gold, platinum, palladium metals and alloys of these metals. Such a composite component is obtainable by the method as defined above.

Preferably, the porous ceramic part is mainly composed of Reaction Bonded Silicon Nitride.

Advantageously, the porous ceramic part or body is a net-shape preform of the composite component.

Preferably the metallic material is pure gold, platinum or palladium or alloys of gold and silicon, alloys of platinum and silicon or alloys of palladium and silicon. More preferably the metallic material is pure gold or alloys of gold and silicon.

Preferably, the amount of the metallic material is higher than 75% by weight of the total weight of said composite component.

The composite component of the invention has a hardness greater than 500 HV but preferably above 1000 HV and a minimum hallmarking quality according the following standards of fineness expressed in parts per thousand (‰) in relation to the total mass of the composite component 375-585-750-916-999. The composite component of the invention is easier to work with than a composite material comprising a boron-based ceramic and a precious metal, especially since the finishing operations are limited due to the use of a net-shape preform.

The present invention relates also to a timepiece comprising a composite component as defined above. In this case such composite element can be internal as well as external parts of the timepiece, such as bezel, case, strap, clasp, etc.

The present invention relates also to a timepiece or a jewelry part comprising a composite component as defined above. In this case such composite element can be a ring, bracelet, cuff links, brooch, etc.

What is claimed is:

1. A method for manufacturing a composite component of a timepiece or of a jewelry part, the composite component is 3 mm or less in thickness and comprises a porous ceramic part and a metallic material filling the pores of said ceramic part, said method comprising:
   providing a porous ceramic preform of the component,
   providing a metallic material,
   heating the metallic material to a temperature higher than the melting point of the metallic material,
   filling the pores of the ceramic preform with the molten metallic material without application of additional pressure,
   cooling the metallic material and the ceramic preform to obtain a solidified metallic material in the pores of the ceramic preform, and
   applying finishing treatments to obtain the composite component, wherein said porous ceramic preform consists essentially of a material selected from the group consisting of $Si_3N_4$, $SiO_2$ and mixtures thereof, and said metallic material is selected from the group consisting of gold, platinum, palladium metals and alloys of these metals.

2. The method according to claim 1, wherein the metallic material is pure metal.

3. The method according to claim 1, wherein the metallic material is an alloy of said metal and silicon.

4. The method according to claim 1, wherein the ceramic preform of the composite component is a net-shape preform.

5. The method according to claim 1, wherein a porosity level of the porous ceramic preform is calculated according to a desired carat level to be achieved by the composite component.

6. The method according to claim 1, wherein the filling of the pores of the ceramic preform with the molten metallic material is an infiltration step by an infiltration process.

7. The method according to claim 1, further comprising coating the internal walls of the pores of the ceramic preform with a wetting agent before the step of filling the pores of the ceramic preform with the molten metallic material.

8. The method according to claim 7, wherein the wetting agent is pure gold or a gold alloy.

* * * * *